United States Patent [19]

Känsäkoski

[11] Patent Number: 5,317,600
[45] Date of Patent: May 31, 1994

[54] COARSE TUNING OF THE CHANNEL FREQUENCY

[75] Inventor: Antti Känsäkoski, Oulu, Finland

[73] Assignee: Nokia Mobile Phones Ltd., Salo, Finland

[21] Appl. No.: 882,452

[22] Filed: May 12, 1992

[30] Foreign Application Priority Data

May 14, 1991 [FI] Finland .................................. 912347

[51] Int. Cl.⁵ ........................ H04L 27/06; H04L 7/04; H04L 7/00; H04L 25/36
[52] U.S. Cl. ...................................... 375/97; 375/111; 375/84; 329/307
[58] Field of Search .................. 375/97, 111, 118, 119, 375/39, 84; 329/306, 307, 346; 331/18, 34

[56] References Cited

U.S. PATENT DOCUMENTS

| | | | |
|---|---|---|---|
| 4,213,006 | 7/1980 | Gerges | 375/97 |
| 4,977,580 | 12/1990 | McNicol | 375/111 |
| 5,136,616 | 8/1992 | Dent | 375/111 |

Primary Examiner—Stephen Chin
Assistant Examiner—Duane Kobayashi
Attorney, Agent, or Firm—Darby & Darby

[57] ABSTRACT

The channel frequency of a digital radiotelephone is coarse tuned utilizing the phase information of the symbols. According to the invention the phase change between the measured phases of one or more received symbols (d) and the previous symbol (e) is detected, the phase change being compared with allowed phase changes. Based on this a decision (g) is made concerning the phase of the transmitted symbol, the phase error ($f_{err}$) or difference between the decision (g) and the measured phase change (d) is generated, and on this basis the channel frequency is adjusted.

11 Claims, 3 Drawing Sheets

COARSE TUNING OF THE CHANNEL FREQUENCY

SCOPE OF THE INVENTION

The present invention relates to a method for coarse tuning the channel frequency, and to a carrier tracker implementing such a method.

BACKGROUND OF THE INVENTION

The method of the present invention relates to coarse tuning a digital radiotelephone's channel frequency receiver's down converter frequency error when the telephone switches from one channel to another.

This problem is particularly emphasized when a dual-mode analog/digital telephone, e.g., a dual-mode radio telephone used in the United States (USDMR), is switched from the analog channel to the digital channel. In the analog state (e.g., using the AMPS system) the frequency stability requirement of the base station is 1.5 ppm, and the requirement on the telephone is 2.5 ppm. Correspondingly, in the digital state the base station frequency stability requirement is 0.25 ppm and on the mobile station it is ±200 Hz. Thus, the frequency error when the telephone operates on the digital channel after switching over from the analog channel could be as high as 2500+250 Hz. A frequency error of this magnitude means a considerable phase error for each symbol, depending on the symbol rate. In the above case, at the USDMR system symbol rate of 24,300 baud, the phase error would be more than 40 degrees per symbol, when the system utilizes differentially encoded quadrature amplitude modulation (QAM). The frequency error must be reduced in order to synchronize the receiver to the incoming data.

DESCRIPTION OF THE PRIOR ART

In the prior art, a coherent carrier tracker is used for coarse frequency tuning using the measured absolute phases of a differentially encoded signal, in order to correct the phase error of the received signal. Such a method is accurate, but is unable to follow and correct a large frequency error.

In order to overcome this problem, it is known to use a multiple of the symbol rate, obtained by nonlinearity (the incoming signal is raised to a power of four) and filtering, and onto which a phase lock can be locked. This system works in theory, but its practical use in a varying field (fading) is not well known. Moreover, this system is complicated and thus expensive, particularly when used in a mass-produced article such as a mobile phone.

SUMMARY OF THE INVENTION

One object of the present invention is to devise a method for coarse tuning the channel frequency in a digital radio receiver which obviates the above problems in a simple and inexpensive way.

A second object of the present invention is to devise an arrangement, such as a carrier tracker which realizes this coarse tuning method.

The method and the arrangement of the invention may be characterized as a base and carrier tracker, which determines the receiver's channel frequency error based on the received signal, and outputs the error information to a frequency generator which controls the frequency in order to correct the frequency. With the method and the apparatus implementing this method, it is possible to rapidly correct even a large frequency error to be nearly correct, after which the fine tuning can be made with other known algorithms.

BRIEF DESCRIPTION OF THE DRAWINGS

The invention is described in more detail below by embodiment examples and the enclosed drawings in which.

DETAILED DESCRIPTION OF THE PREFERRED EMBODIMENT

Figure 1:
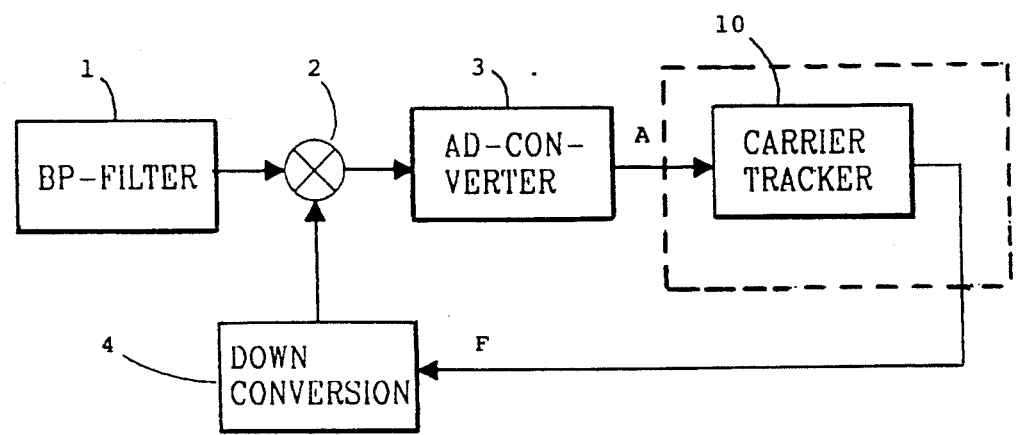
FIG. 1 is a block diagram showing how a carrier tracker is connected to other components of a radiotelephone receiver.

FIG. 1 shows a simplified block diagram illustrating how a carrier tracker according to the present invention is connected to other components of a radiotelephone receiver (showing only those parts necessary to understand the invention). The incoming symbol flow (or the received digital signal) passes through the band-pass filter 1 to the mixer 2, to which the receiver channel frequency is also connected. The channel frequency is formed in the frequency generator or down converter 4 out of the frequency generated by an oscillator (not shown). The mixing result is supplied to the analog to digital converter 3, which outputs a base band digital signal A or the symbol sequence. The signal A is input to a carrier tracker 10 according to the present invention.

Figure 2:
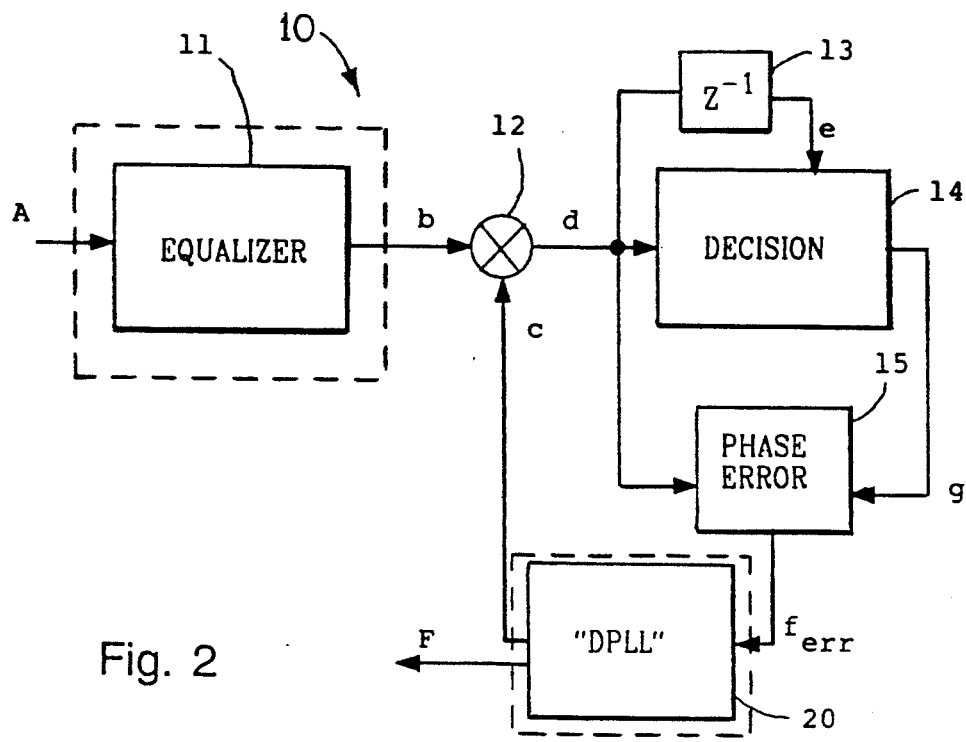
FIG. 2 is a block diagram of the carrier tracker.

FIG. 2 shows the carrier tracker 10 in more detail. The carrier tracker signal A is first directed through a channel equalizer 11, which corrects errors caused by stable multipath propagation, and transmits its output, signal b, to a multiplier 12. The channel equalizer 11 is not indispensable, but it improves the performance in extreme situations. The multiplier 12 output, signal d, is applied to three components. It is applied (1) directly to measurement or decision block 14, and (2) to a delay 13 having a delay of one symbol which then applies the signal to decision block 14, and (3) to phase error block 15, which generates a phase error. The output signal g of the decision block 14 is also applied to the phase error block 15. The output signal $f_{err}$ of the phase error block 15 is applied to a double phase locked loop 20 ("DPLL"), which produces a signal c to the mixer 12 and a signal F to the down converter 4 (shown in FIG. 1).

In a method according to the present invention, the channel frequency coarse tuning is performed so that:

(a) the phase (signal d) of a respective received symbol (signal b) is measured in the receiver;

(b) the decision block 14 generates the difference or the phase change (df=signal d−signal e) between the measured phase of signal d and the measured phase of signal e of a previous symbol b-1 coming via the delay 13;

(c) signal decision block 14 compares the phase change df with predefined allowed phase changes and a decision is made concerning the transmitted phase g of the symbol (signal d);

(d) block 15 generates a difference or phase error signal ($f_{err}$=signal g−signal d) between the decision block output (signal g) and the measured phase of signal d; and, preferably, block 20 generates the average of a plurality of phase errors; after which (e) the frequency generator 4 controlling the channel frequency is adjusted in a feedback loop (comprising blocks 2, 3, 10 and 4, in FIG. 1) with the control signal F generated in block 20 based on the phase error $f_{err}$. From the block 20, a signal c is output as feedback to the multiplier 12.

In the method of the invention, the phase difference between the two most recently received symbols is thus measured so that there is made no decision for either symbol as such, but the decision is made according to the phase difference between these two symbols. This leads to the non-coherency of the carrier tracker according to the invention, which means that it can perform a rapid and coarse frequency error correction, but will not correct the phase error.

If, for example, the phase error of the first examined symbol is 90 degrees, the measured phase of the second symbol is 91 degrees (the predetermined correct value would be 90 degrees) and the measured phase of the third symbol is 182 degrees (the correct value being 180 degrees), it is realized that on the average the phase error is 1.5 degrees per symbol. From this average phase error F it is further possible to calculate the frequency error F' and to perform the corresponding frequency error correction of the frequency generator. Thus, the arrangement for the symbol phase error measurement operates as a coarse frequency tuning block (coarse AFC).

Figure 4:
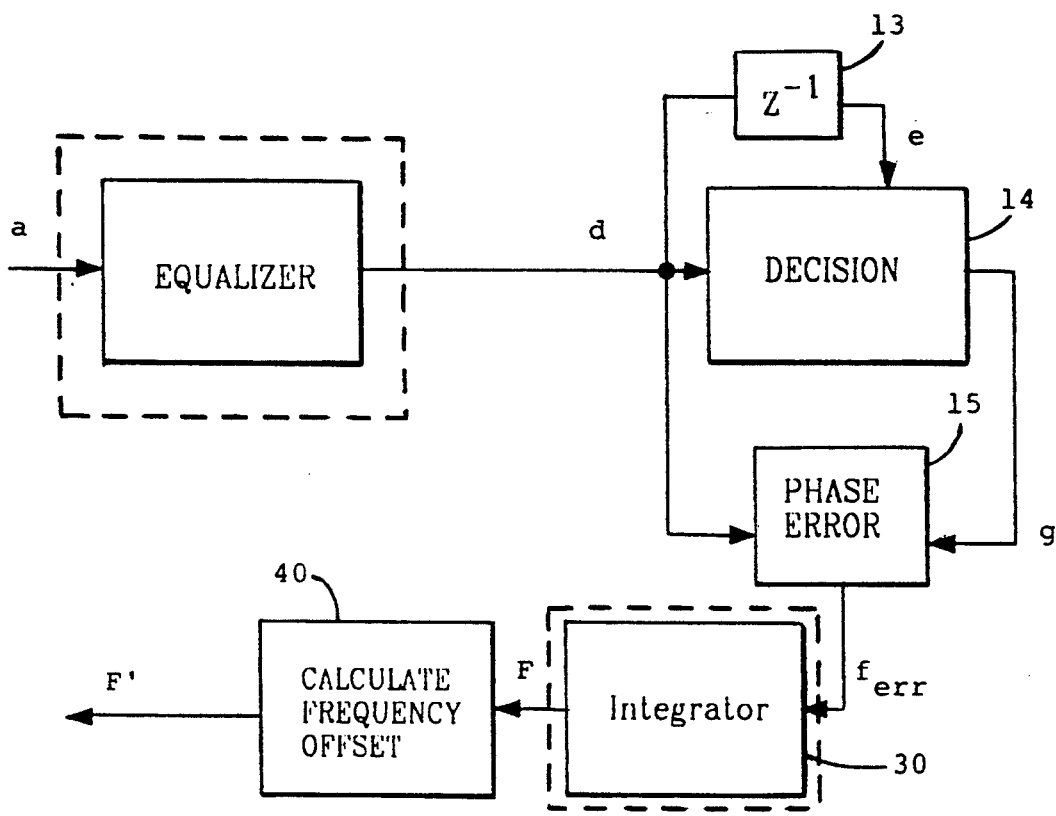
FIG. 4 is a block diagram of an alternative embodiment of the carrier tracker.
Figure 5:
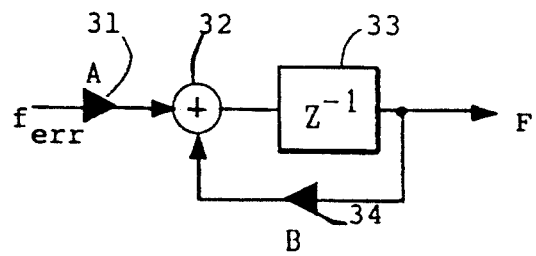
FIG. 5 is a block diagram of the integrator shown in FIG. 4.

The method according to the invention may be modified so that in step (d) the generation of the average of a plurality of phase errors is replaced by integrating the phase error $f_{err}$. This embodiment is shown in FIG. 4 as a block diagram. Here, the phase error $f_{err}$ is output to an integrator 30. The integrator is realized according to FIG. 5. In this case, no multiplier 12 is used, and thus, no feedback signal c is used. The block diagram of FIG. 4 functions in all other respects as the block diagram in FIG. 2.

The phase error is obtained by the integration with greater precision, and thus the frequency error may be corrected with greater precision. The frequency offset may be calculated so that:

Frequency offset=$Ts$*(integrated phase error/360), where Ts is the symbol rate in baud.

If, for instance, the phase error is 1 degree, and the symbol rate 24,300 baud, then the following is obtained:

frequency offset=24,300*(1/360)=67.5 Hz.

In order to have a more accurate correction of the frequency error the steps from (a) to (e) may be performed during a sufficiently long time, e.g., during a predetermined period, or until a sufficiently insignificant frequency offset is reached.

According to simulations with the algorithm according to the invention, it is possible to correct frequency errors greater than ±3 kHz, both in an optimal and in a varying (fading) field. A coarse adjustment of this kind is sufficient in order to reach the imposed objectives of the present invention. After the coarse adjustment, the signal may be fine tuned by any method known in the art.

Figure 3:
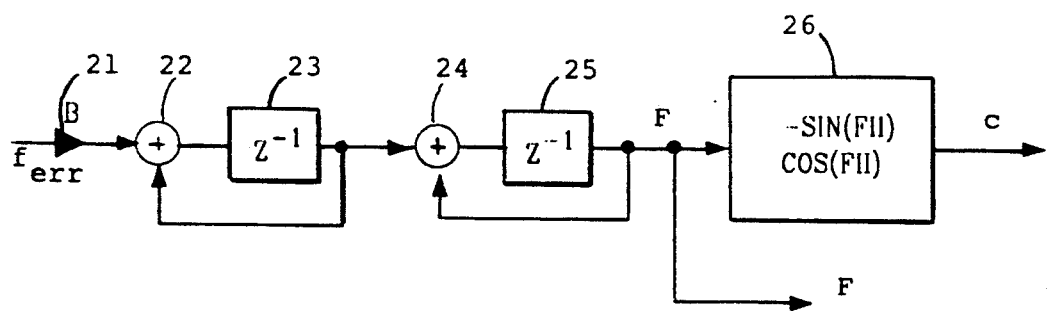
FIG. 3 is a block diagram of the phase locked loop shown in FIG. 2.

Preferably, a carrier tracker of FIGS. 2 and 3 can be realized with digital technology as the other functions of a radiotelephone. It is particularly preferred to use digital signal processing (DSP) techniques. This technique is also suited to realize the algorithm of FIGS. 4 and 5. The carrier tracker according to the invention may be applied in digital mobile phones, preferably, e.g., in the USDMR mobile phone system in the United States.

What is claimed is:

1. A method for coarse tuning of a channel frequency in a digital radiotelephone receiver, whereby phase information contained in symbols of a differentially encoded, quadrature amplitude modulated (QAM) signal transmitted on the channel is used for the coarse turning, comprising the steps of:
   a) measuring a phase of a received symbol;
   b) generating a signal indicating a phase change between the measured phase of the received symbol and a measured phase of a previously received symbol;
   c) comparing the signal indicating the phase change with predefined allowed phase changes;
   d) deciding, based on the comparison, a transmitted phase of the received symbol;
   e) generating a phase error signal indicting a phase difference between the decided transmitted phase and the measured phase of the received symbol; and
   f) adjusting a frequency generator which controls the channel frequency according to the phase error signal.

2. The method of claim 1, wherein the step of generating a phase error signal further includes generating an average of two or more of phase errors.

3. The method of claim 1, further including the step of integrating the phase error signal before adjusting the frequency generator.

4. The method of claim 1, 2 or 3, wherein each step is repeated during a predetermined period.

5. The method of claim 1, 2 or 3, wherein each step is repeated until a predetermined small phase offset is reached.

6. The method of claim 1, wherein the step of adjusting the frequency generator further includes adjusting a feedback loop signal according to the phase error signal.

7. A carrier tracker, comprising:
   a) symbol receiving means for receiving a transmitted information symbol;
   b) means connected to the symbol receiving means for measuring a phase of the transmitted information symbol;
   c) means connected to the phase measuring means for generating a signal indicating a phase change between a measured phase of the received symbol and a measured phase of a previously received symbol;
   d) means connected to the signal generating means for comparing the generated signal with predetermined phase changes;
   e) means connected to the comparing means for determining a transmitted phase of the received symbol based on an output of the comparing means;
   f) means connected to the determining means for generating a phase error signal indicating a phase difference between an output of the determining means and the measured phase of the received symbol; and g) a frequency generator connected to and responsive to an output of the phase error signal generator means.

8. The carrier tracker of claim 7, wherein the carrier tracker is part of a digital signal processor.

9. The carrier tracker of claim 7, wherein the phase measuring means includes mixing means for mixing the transmitted information symbol with an output of a phase locked loop.

10. The carrier tracker of claim 9, wherein the phase locked loop is also connected between the phase error signal generating means and the frequency generator.

11. The carrier tracker of claim 7, further including an integrator connected to an output of the phase error generating signal means and a frequency offset calculator connected between the integrator and the frequency generator.

* * * * *